Feb. 25, 1969  C. D. LOYD ET AL  3,429,591
PRECOMBUSTION CHAMBERS
Original Filed Oct. 28, 1964
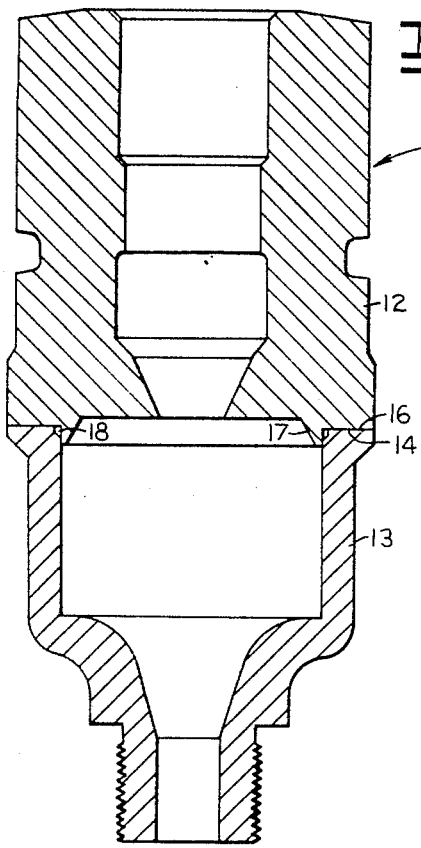
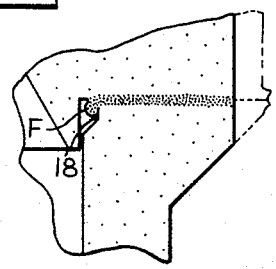
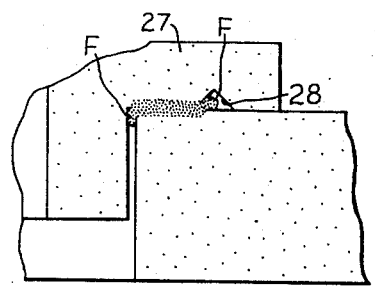
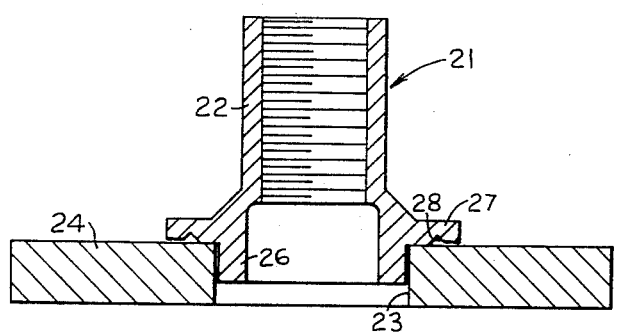
INVENTORS
CALVIN D. LOYD
BY RALPH W. YOCUM
Fryer and Grinwald
ATTORNEYS United States Patent Office 3,429,591
Patented Feb. 25, 1969

3,429,591
PRECOMBUSTION CHAMBERS
Calvin D. Loyd and Ralph W. Yocum, Peoria, Ill., assignors to Caterpillar Tractor Co., Peoria, Ill., a corporation of California
Continuation of application Ser. No. 407,119, Oct. 28, 1964. This application Sept. 6, 1967, Ser. No. 665,937
U.S. Cl. 285—189                               2 Claims
Int. Cl. F16e 13/02; B23k 27/00

ABSTRACT OF THE DISCLOSURE

The abutting surfaces of two parts are rotated under pressure relative to each other producing a friction weld. Trap means are provided for containing and preventing the flash from the welded area moving to an undesired location.

---

This application is a continuation of my earlier application Ser. No. 407,119, filed Oct. 28, 1964, and now abandoned.

This invention relates to articles produced by a welding process of the kind wherein engaged ends of two parts are rotated in rubbing contact under pressure until the ends are worked to a plastic condition at which a weld can be formed by flashing some of the plastic material from the weld area. More particularly, this invention relates to a flash trap construction for receiving and containing the flash and for preventing the flash from moving to some undesired area.

In many cases exposed flash, as produced by the welding process noted above, is either objectionable generally because of appearance or objectionable because of problems caused by the flash later breaking off and interfering with the operation of the larger assembly of which the welded article forms a part. Thus, in the case of welded precombustion chambers for internal combustion engines, any flash which is extruded into the interior of the chamber is undesirable. This flash can later break off and fall into the engine causing scuffing of the cylinder walls. In the welding of a boss to a plate it is desirable to avoid exposed flash because of the objectionable appearance of the exposed flash.

It is therefore an object of the present invention to trap the flash extruded by this type of welding process at the time that the flash is formed. The flash trap of the present invention receives and contains the extruded flash to prevent the flash from moving into a location where it could cause trouble. The flash trap of the present invention also hides such flash from view.

Further and more specific objects and advantages of the invention will be made apparent in the following specification wherein reference is made to the accompanying drawing.

In the drawing:

FIG. 1 is a cross-sectional side elevation view through a precombustion chamber having a flash trap formed in accordance with the present invention;

FIG. 2 is a fragmentary enlarged view showing details of the way the flash is trapped at the time the two parts of the precombustion chamber shown in FIG. 1 are welded together;

FIG. 3 is a cross-sectional side elevation view showing a flash trap incorporated in a boss and plate welded in accordance with the present invention; and FIG. 4 is a fragmentary enlarged view showing details of the way the flash is trapped in the boss and plate construction shown in FIG. 3.

A precombustion chamber constructed in accordance with one embodiment of the present invention is shown in FIG. 1 and is indicated generally by the reference numeral 11. The precombustion chamber comprises an upper tubular part 12 and a lower tubular part 13. The upper part 12 is formed with a radially extending end face 14, and the lower part 13 is formed with a radially extending end face 16 for welding to the end face 14. The upper part 12 has an axially extending flange 17 disposed at the inner diameter of the end face 14. The outer surface of the flange 17 is slightly spaced from the inner surface of the lower part 13 to prevent rubbing contact between these surfaces when the upper and lower parts are rotated to weld the end faces 14 and 16 together.

The two parts 12 and 13 are welded together, across the interface defined by the engagement of end faces 14 and 16, by rotating one part with respect to another until the material at the interface becomes sufficiently plastic to permit a sound weld to be formed. In this process of welding a substantial amount of the plastic material at the interface is extruded from the inner and outer boundaries of the interface. In the case of the precombustion chamber 11, the flash extruded from the outer boundary is no problem because this flash can readily be machined off. However, the flash extruded from the inner boundary can be a problem. Because of the configuration of the part, it would be quite difficult to machine off such flash. If the flash is not removed or otherwise taken care of, the flash can later break off and be expelled from the interior of the precombustion chamber into the engine cylinder. This in turn could result in scuffing of the cylinder walls.

The present invention isolates this flash extruded from the inner boundary of the interface to prevent the flash from getting into the interior of the precombustion chamber. The face 14 is formed with a counterbore 18 at the inner diameter of the end face. This counterbore provides a chamber, which is covered by the flange 17, for receiving all of the flash F (see FIG. 2) extruded in that direction. This construction effectively prevents the flash F from getting into the interior of the precombustion chamber.

Another embodiment of the present invention is shown in FIGS. 3 and 4 in which a boss and plate are indicated generally by reference numeral 21. In this construction an internally tapped boss 22 is partly disposed within a circular hole 23 in the plate 24. The boss 22 has an axially extending tubular portion 26 disposed within the hole 23 but slightly spaced therefrom. The boss 22 also includes a radially extending flange 27. The inner portion of the flange 27 is welded to the plate 24, as best shown in FIG. 4, while the slightly thinner outer portion is slightly spaced from the plate 24 to prevent contact between the lower surface of the flange and the facing surface of the plate at this location until the final stages of the weld.

The boss 22 is welded to the plate 24 by engaging the lower surface of the inner part of the flange with the plate under pressure and rotating the boss with respect to the plate to develop sufficient heat by the rubbing contact to bring the engaged surfaces to a plastic condition. As with the precombustion chamber noted above, some of the plastic material is extruded from the inner boundary and from the outer boundary as flash F. The flash extruded from the inner boundary presents no problem in the case of the boss and plate construction shown in FIGS. 3 and 4. However, the flash extruded from the outer boundary of the interface is unsightly if this flash is permitted to extend from underneath the outer edge of the flange 27.

In accordance with the present invention, the flange 27 is formed with a groove 28 between the thinner outer portion of the flange and the inner portion welded to the plate 24. This groove encircles the outer boundary of the weld zone and is covered by the opposed surface of the plate 24 to provide a chamber for receiving and containing the flash F extruded in this direction. As the weld between the inner portion of flange 27 and the plate is completed the thinner outer portion of the flange comes into contact with the plate to seal the groove 28 and provide additional support for the boss. This contact is not of sufficient duration to create any flash at this location. The chamber formed by the groove 28 traps the flash F and effectively prevents any of the flash from seeping out underneath the outer edge of the flange 27, and thereby improves the appearance of the boss and plate construction.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A flash trap for receiving and containing flash extruded from the interface area of two parts welded by a process in which the engaged surfaces of the parts are rotated in rubbing contact and flash is extruded from the interface, and comprising first and second parts welded across a common interface with one of the parts having a groove encircling one of the boundaries of the interface and disposed closely adjacent to the boundary and covered by a closely-spaced surface of the other part to provide a trap receiving and containing the flash extruded from that boundary of the interface, and wherein the first part is a plate having a circular hole extending therethrough and wherein the second part is a boss having an axially extending tubular portion extending within the hole and slightly spaced therefrom and having a radially extending flange extending closely adjacent a lateral surface at its outermost portion and welded to said lateral surface of the plate at an innermost portion encircling the hole, the groove being formed in the surface of the flange which faces the plate between the inner and outer portions and receiving and containing the flash extruded radially outwardly from the welded area of the flange and plate to prevent the flash from extruding from underneath the outermost edge of the flange, the outermost portion of the flange being slightly axially spaced from the plate to prevent initial engagement between that portion of the flange and the plate and the development of any flash at that location during the time the boss is rotated with respect to the plate to weld the inner portion of the boss to the plate.

2. A flash trap for receiving and containing flash extruded from the interface area of two parts welded by a process in which engaged surfaces of the parts are rotated in rubbing contact and flash is extruded from the interface, and comprising first and second parts welded across a common interface with one of the parts having a groove encircling one of the boundaries of the interface and disposed closely adjacent to the boundary and covered by a closely-spaced surface of the other part to provide a trap receiving and containing the flash extruded from that boundary of the interface and wherein the first part is a plate and wherein the second part is a boss having a radially extending flange extending closely adjacent to a lateral surface of the plate at the outermost portion of the flange and welded to said lateral surface of the plate at an innermost portion of the flange, the groove being formed in the surface of the flange which faces the plate between the inner and outer portions and receiving and containing the flash extruded radially outwardly from the welded area of the flange and plate to prevent the flash from extruding from underneath the outermost edge of the flange, the outermost portion of the flange being slightly axially spaced from the plate to prevent initial engagement of that portion of the flange and the plate and the development of any flash at that location during the time the boss is rotated with respect to the plate to weld the inner portion of the boss to the plate.

References Cited

UNITED STATES PATENTS

| 2,148,505 | 2/1939 | Rosen | 123—33 |
| 2,732,229 | 1/1956 | Gaum | 285—286 X |

FOREIGN PATENTS 572,789   10/1945   Great Britain.

CARL W. TOMLIN, Primary Examiner.

DAVE W. AROLA, Assistant Examiner.

U.S. Cl. X.R.

285—286; 29—470.3